United States Patent [19]

O'Neill

[11] Patent Number: 4,878,645
[45] Date of Patent: Nov. 7, 1989

[54] APPLIANCE RETAINING ADAPTOR

[75] Inventor: Edward L. O'Neill, San Leandro, Calif.

[73] Assignee: Lucasey Manufacturing Company, Inc., Oakland, Calif.

[21] Appl. No.: 235,271

[22] Filed: Aug. 23, 1988

[51] Int. Cl.[4] ............................................. A47B 97/00
[52] U.S. Cl. .................................. 248/680; 248/231.2
[58] Field of Search ............ 248/551, 680, 201, 220.4, 248/221.1, 221.2, 224.4, 231.2, 288.1, 500, 506, 674, 675, 507, 508, 298, 295.1; 410/90, 91, 101; 70/58, 62, DIG. 57, 232

[56] References Cited

U.S. PATENT DOCUMENTS

| | | | |
|---|---|---|---|
| 1,370,453 | 3/1921 | Kilgour | 248/298 |
| 2,208,860 | 7/1940 | Smart | 248/500 |
| 3,136,523 | 6/1964 | Munroe | 248/222.1 |
| 3,485,382 | 12/1969 | Larson | 248/221.1 |
| 3,545,711 | 12/1970 | Scheneman | 248/221.2 |
| 3,836,105 | 9/1974 | Marschak | 248/221.1 |
| 3,879,006 | 4/1975 | Staudte, Jr. | 248/221.2 |

FOREIGN PATENT DOCUMENTS

| | | | |
|---|---|---|---|
| 1049478 | 2/1979 | Canada | 248/221.2 |
| 2838962 | 3/1980 | Fed. Rep. of Germany | 298/222.1 |
| 357963 | 12/1961 | Switzerland | 248/221.2 |
| 1483450 | 8/1977 | United Kingdom | 248/220.4 |

*Primary Examiner*—Ramon O. Ramirez
*Assistant Examiner*—Robert A. Olson
*Attorney, Agent, or Firm*—Niro, Scavone, Haller & Niro, Ltd.

[57] ABSTRACT

A retaining adaptor is provided which secures appliances such as televisions to appliance support devices without necessitating any structural change or other damage to the appliance.

5 Claims, 1 Drawing Sheet

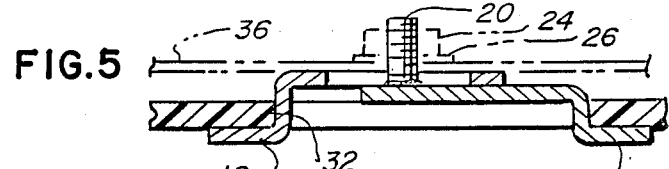
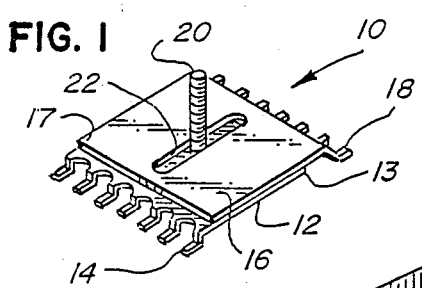
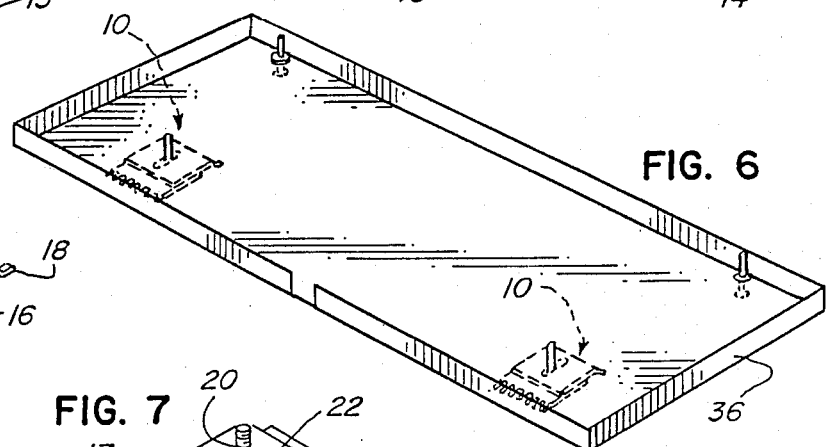
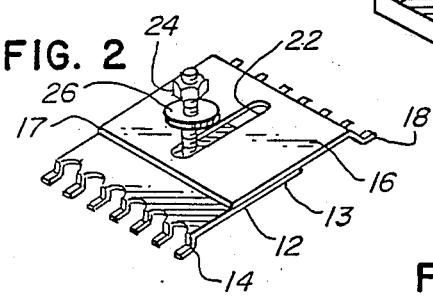
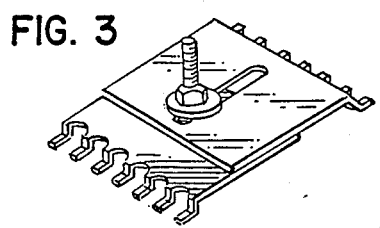
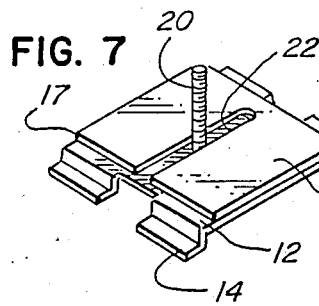
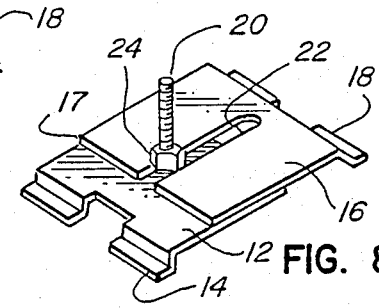
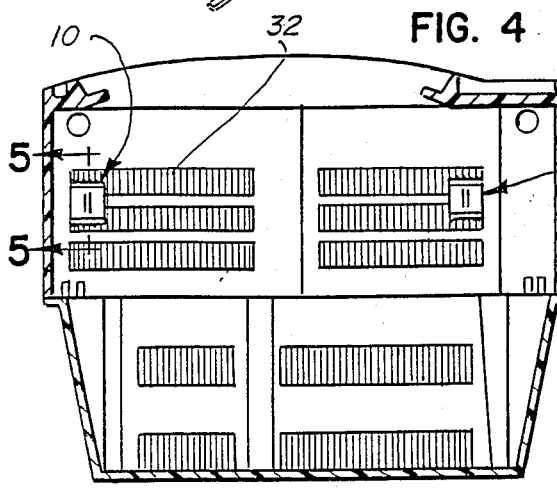
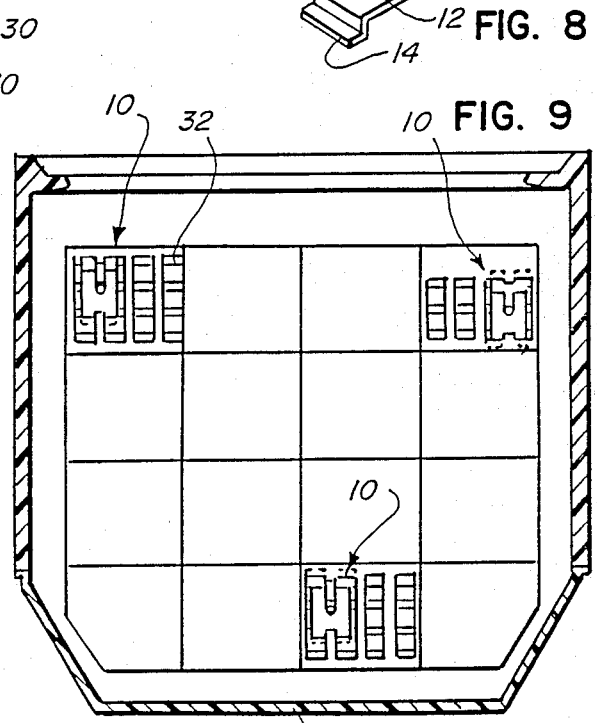
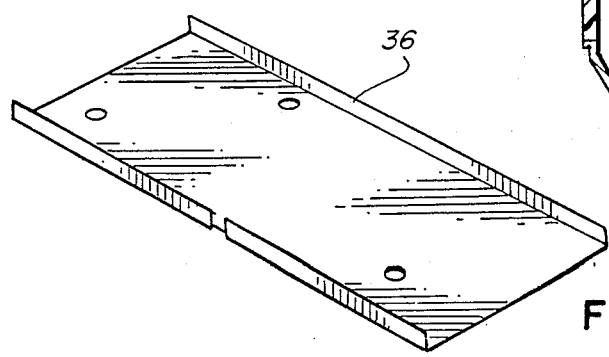

APPLIANCE RETAINING ADAPTOR

BACKGROUND OF THE INVENTION

The present invention relates generally to retaining adaptors and, more particularly, to retaining adaptors which secure appliances having vents or slots to appliance support devices.

In the past, appliances such as televisions, VCR's, monitors, radios, cash registers, computers and the like, were manufactured with boss plates, typically found on the bottom of these appliances. The boss plate enabled the appliance to be readily attached to an appliance support which was designed to mount the appliance for convenience and also to prevent theft of the appliance in settings such as hotel rooms and bars. The boss plate consisted of a plate with a hole or leg having a hole, and provided an area where a self-tapping screw, for instance, could be affixed within the hole of the boss plate. This self-tapping screw could then be attached to a component of the appliance support to secure the appliance.

In recent years, however, appliance manufacturers have stopped providing boss plates on their appliances. This makes it more difficult to readily attach the appliance to the appliance support. Therefore, a need exists for an adaptor to easily and securely affix the appliance to the appliance support. Preferably, such an adaptor must be able to accommodate a variety of appliances and should not require that the appliance be structurally altered or otherwise damaged.

SUMMARY OF THE INVENTION

The present invention overcomes the problems presently associated with securing an appliance to a support when the appliance has no boss plate or other means available for such purpose. In order to overcome this problem the present invention utilizes the slots or vents typically found on the back, sides or bottom of the appliances.

The invention is generally directed to a retaining adaptor for appliances, and particularly to a retaining adaptor to secure the appliance to an appliance support using the vents or slots found in the housing of the appliance. The retaining adaptor includes a first carrier plate and a second carrier plate which is substantially co-planar with respect to the first carrier plate, each of the carrier plates having structure to engage the vents or slots of the appliance housing. Additionally, the retaining adaptor includes structure permitting lateral displacement of the carrier plates to accommodate a wide variety of appliances, as well as structure to connect the first and second carrier plates in fixed orientation in order to retain the appliances. Finally, structure is also provided to affix the retaining adaptor to the appliance support.

In one embodiment of the present invention, the structure provided to engage the vents of the appliance are tabs on each of the carrier plates. In another embodiment of the present invention, an array of teeth is provided to engage the slots of the appliances.

Therefore, an object of the present invention is to provide an retaining adaptor which secures an appliance to an appliance support.

Another object of the present invention is to provide a retaining adaptor that will accommodate a variety of appliances.

Yet another object of the present invention is to provide a retaining adaptor which does not structurally alter or otherwise damage the appliance.

A further object of the present invention is to provide an retaining adaptor that is inexpensive to manufacture, easy to install, and can be used with a variety of appliances and appliance support devices.

BRIEF DESCRIPTION OF THE DRAWINGS

Further objects, advantages and embodiments of the present invention, together with its organization and manner of operation, will become apparent from the following detailed description taken in conjunction with the accompanying drawings wherein like reference numerals designate like elements throughout the several views.

FIG. 1 is a perspective view of an appliance retaining adaptor of the present invention;

FIG. 2 is a perspective view of the present invention showing the plates laterally displaced;

FIG. 3 is a perspective view of the present invention showing the carrier plates retained in fixed orientation in relation to one another;

FIG. 4 is a bottom plan view of an appliance showing placement of the retaining adaptor in the vents of the appliance;

FIG. 5 is a cross-sectional view of the retaining adaptor installed in an appliance taken along line 5—5 of FIG. 4;

FIG. 6 is a bottom perspective view of a component of an appliance support with the retaining adaptor shown in phantom lines;

FIG. 7 is a perspective view of another embodiment of the present invention similar to FIG. 1;

FIG. 8 is a perspective view of another embodiment of the present invention similar to FIG. 3;

FIG. 9 is a bottom plan view of an appliance with the embodiment of FIGS. 6 and 7 installed; and FIG. 10 is a bottom perspective view of a component of an appliance support.

DETAILED DESCRIPTION OF THE PREFERRED EMBODIMENTS

The appliance retaining adaptor of the present invention is shown generally as 10 in FIG. 1. Retaining adaptor 10 includes a first carrier plate 12. Carrier plate 12 has two ends, 13 and 14, one of which is provided with an array of teeth 14. The other end 13 of carrier plate 12 is straight. A second carrier plate 16 is also provided, and like first carrier plate 12, second carrier plate 16 has two ends, 17 and 18, one of which is provided with an array of teeth 18. As will be hereinafter described, the array of teeth on ends 14 and 18 provide a means to engage the vents of an appliance (see FIGS. 4 and 5).

In a preferred embodiment of the present invention, first carrier plate 12 has a post 20. Post 20 is generally centered on and extends perpendicular to first carrier plate 12. It will be understood by those of skill in the art that post 20 can be a variety of configurations and need not have to be centered on first carrier plate 12. Second carrier plate 16 is provided with an elongated slot 22. Slot 22 is sized larger than post 20 and extends generally between the two ends 17 and 18 of the second carrier plate 16. In this manner, second carrier plate 16 is slidable along first plate 12 and provides a means for laterally displacing the carrier plates 12 and 16 to accommodate appliances having varied size, spacing and location of vents (not shown in FIG. 1).

With reference to FIG. 2, a means to connect the carrier plates 12 and 16 within the vents of the appliance in fixed orientation with one another is provided. In this embodiment, the plates are retained by a nut 24 and washer 26. As can be seen in FIG. 3, nut 24 and washer 26 are on post 20 in a tightened position and, thus, secure the first carrier plate 12 and second carrier plate 16 in the desired orientation.

The function and operation of the retaining adaptor 10 will be described. With reference to FIGS. 4 and 5, the retaining adaptor 10 is shown installed in an appliance 30 (here a television set) in the vents or slots 32 of the appliance 30. The teeth 14 and 18 of carrier plates 12 and 16 are sized and spaced so as to engage the vents 32 and become secured under the appliance 30 housing (FIG. 5). First carrier plate 12 is positioned under the vents 32. Second carrier plate 16 is placed over post 22 and slid into engagement with other vents 32. FIGS. 1-3 show the carrier plates in various stages of orientation, depending upon the spacing and size of the vents. When the teeth 14 and 18 are engaged within the vents 32 of appliance 30, nut 24 and washer 26 are tightened (FIG. 3) and the orientation of the carrier plates fixed and secured to the appliance 30. As can be seen in FIG. 3, the portion of post 22 extending beyond nut 24 and washer 26 provides a means to attach to an appliance support, a portion of which is shown in FIG. 6 as 36. In this manner, the appliance 30 is securely attached by its vents 32 to an appliance support 36.

It will be understood by those of skill in the art that the first carrier plate 12 is generally co-planar with second carrier plate 16. As will also be understood that teeth 14 and 18 lie on a plane generally below the carrier plates 12 and 16 so that the teeth 14 and 18 may properly engage vents 32.

FIGS. 7-10 show another embodiment of the present invention. FIGS. 7 and 8 show the retaining adaptor 10 having tabs 14 and 18 which engage the vents of the appliance 30. This embodiment is useful in appliances having vents 32 of the type shown in FIG. 9. As with the other embodiment, post 20 is then secured to an appliance support 36 as shown in FIG. 10.

It will be understood by those of skill in the art that there are a variety of configurations which the present invention may take. For example, one of the carrier plates could provide a channel within which the other carrier plate is slidably engaged. And, the size and spacing of the teeth or tabs 14 and 18 can be of a variety of dimensions, depending upon the appliance 30 and its vents 32.

While preferred embodiments of the present invention have been illustrated and described, it will be understood that changes and modifications can be made without departing from the invention in its broader aspects. Various features of the invention are set forth in the following claims.

What is claimed is:

1. An apparatus for mounting an appliance to a support, said appliance having a housing with a plurality of aligned apertures, said apparatus comprising:
   a. first and second carrier plates, each said plate having at least one engaging member offset and extending from said plate terminating on a plane substantially parallel to said plate, said engaging members accommodating a variety of configurations of aligned apertures of said housing and having a size to permit receipt within selected apertures of said housing;
   b. means for laterally displacing said first and second carrier plates to vary the spacing between their respective engaging members;
   c. means for holding said first and second carrier plates in fixed position to maintain said engaging members in a desired spaced relationship within said selected apertures; and
   d. means for attaching said first and second carrier plates to said support.

2. A retaining adaptor for an appliance having a housing which includes a plurality of slots for attachment to an appliance support said adaptor comprising:
   a first carrier plate;
   a second carrier plate, said second carrier plate being disposed in substantially co-planar orientation with respect to the first carrier plate, each of said carrier plates having engaging means offset and on a substantially parallel plane lower than said plates for securing said plates to said slots;
   a means for enabling relative lateral displacement of the carrier plates to vary the spacing of said securing means to accommodate housing slots of different size, spacing and/or location;
   a means to secure the first carrier plate to the second carrier plate to hold the engaging means within the slots of the appliance; and,
   a means to attach said carrier plates to said appliance support.

3. The device of claim 2 wherein the engaging means comprises a plurality of teeth.

4. The device of claim 2 wherein the engaging means comprise a tab.

5. The device of claim 2 wherein the engaging means comprises a plurality of tabs.

* * * * *